United States Patent [19]

Field et al.

[11] Patent Number: 4,820,645

[45] Date of Patent: Apr. 11, 1989

[54] TESTING POLYELECTROLYTES

[75] Inventors: John R. Field; David Farrar; Peter Flesher, all of West Yorkshire, United Kingdom

[73] Assignee: Allied Colloids, Ltd., United Kingdom

[21] Appl. No.: 855,518

[22] Filed: Apr. 23, 1986

[30] Foreign Application Priority Data

Apr. 25, 1985 [GB] United Kingdom ............... 8510496
Jul. 3, 1985 [GB] United Kingdom ............... 8516869

[51] Int. Cl.$^4$ ............................................. G01N 27/48
[52] U.S. Cl. ........................................ 436/55; 436/85; 436/149; 436/150
[58] Field of Search ................... 436/85, 129, 151, 55, 436/149, 150

[56] References Cited

U.S. PATENT DOCUMENTS 4,086,200 4/1978 Lamoria et al. .................. 524/166
4,204,934 5/1980 Warren et al. .................... 204/186

FOREIGN PATENT DOCUMENTS 2932445 2/1981 Fed. Rep. of Germany ........ 436/85

OTHER PUBLICATIONS

C.A. 94:49437C, Hubbard et al.

*Primary Examiner*—Michael S. Marcus
*Attorney, Agent, or Firm*—Ostrolenk, Faber, Gerb & Soffen

[57] ABSTRACT

Measurement of the ionic value X of a solution of a polyelectrolyte after shearing, for instance by a rotating blade, and/or measurement of the ionic value Y of a solution of polyelectrolyte before shearing, and especially the difference between the values X and Y, gives a useful indication of the degree of cross linking of the polyelectrolyte and so can be utilized to control the manufacture of the polyelectrolyte, for instance drying conditions, or the storage or use of the polyelectrolyte, for instance its suitability or dosage in a flocculation process.

13 Claims, No Drawings

TESTING POLYELECTROLYTES

Polyelectrolytes are used in aqueous solution or dispersion in various systems in which the properties of the polymer which result from the presence of the ionic groups give some desirable effect. The properties are usually due to the interaction of the ionic group with other components in the system and it is therefore necessary to be able to analyse the polymer in respect of its ionic groups to be able to determine its composition and activity.

Polyelectrolytes are generally copolymers formed from copolymerisable monomers, for example a copolymer of ionic monomer and a nonionic comonomer. Even if the relative weights of starting materials for the process for producing the polyelectrolytes are known, it is not possible accurately to predict the eventual ionic activity of the polymer for various reasons. One reason is that the monomer concentration in the starting materials may vary from batch to batch. Another is that one of the comonomers may be relatively more likely to remain unpolymerised. Another is that there may be chemical degradation of the monomers before or during polymerisation or of groups in the polymer molecules during polymerisation or during storage, for example esters may be hydrolysed.

In GB No. 1579007, the cationic units of cationic flocculants are estimated using an anionic surface active agent in the presence of a dye. The measured value is compared with a theoretical value which is calculated on the basis of the amount of starting materials fed into the polymerisation reactor. The difference between the theoretical and measured values is said to be associated with the regularity of the distribution of different monomer units along each polymer chain.

It is known that during the production of water soluble or water swellable polymers chain branching or other cross-linking may occur either due to deliberate additions or due to impurities present in the initial polymerisation mixture. This can occur during polymerisation, during drying (if the polymer is to be supplied in dry form) or during storage.

It would be desirable to be able to quantify the precise amount of chain branching or cross linking that has occurred in order to exercise proper control over the manufacture, storage or use of the polymers. Unfortunately at present there is no simple technique by which this can be done.

We have discovered that an important reason why the measured ionic activity of a polyelectrolyte may differ from the theoretical activity is that the polymer molecules may become branched or cross-linked by reaction with chemical groups within the molecules or with unreacted monomer or other reactive species in the polymerisation mixture or product. In particular we now believe that conventional methods for determining the content of ionic groups, for example the cationicity of high molecular weight cationic polymers, have the limitation that the analytical reagent that should interact with the ionic groups may be prevented from doing so by steric hindrance. Thus the ionic groups may be hidden within a molecule because of coiling, branching and/or inter- or intra- molecular bonds such as covalent cross-linking, hydrogen-bonding or hydrophobic attractive forces. In large molecules, the main steric hindrance is due to covalent cross linking.

We have also discovered that the measured ionicity can be altered by subjecting the polymer to shear. These discoveries provide the basis for the desired simple test method for ascertaining the degree of branching or other cross-linking in a polyelectrolyte.

In one aspect of the invention, polyelectrolyte is handled comprising making, storing or using it and we analyse the polyelectrolyte by measuring the ionic value Y of the polyelectrolyte before shearing the polyelectrolyte or the ionic value X of the polyelectrolyte after shearing the polyelectrolyte sufficient to increase the measured ionic value, or we measure both X and Y and we utilise either (1) Y or the difference between X and Y to control the manufacture or storage of the polyelectrolyte or (2) X or the difference between X and Y to control the use of the polyelectrolyte.

The ionic value of the polyelectrolyte may be determined by any suitable laboratory analytical technique capable of giving a reliable indication of the available ionic groups. When the groups are anionic, the reagent used for determining them will normally be cationic and when the ionic groups are cationic, the reagent used for determining them will normally be anionic.

The ionic groups that can most easily be determined are cationic groups and so the invention is best applied to the manufacture, use or analysis of cationic polyelectrolytes. In particular, the method is especially suitable for polyelectrolytes formed from monomer including dialkylaminoalkyl (meth) acrylate (usually as a quaternary ammonium or possibly as an acid addition salt) either as a homopolymer or, more usually, a copolymer with up to about 95 mole percent, usually up to about 90 mole percent non-ionic or other suitable monoethylenically unsaturated monomer, preferably acrylamide. Cross-linking in such polymers is preferably due to polyethylenically unsaturated components present as accidental impurities or as deliberate additions.

The cationicity of such a polyelectrolyte may be measured by the method described in GB No. 1,579,007 or by Colloid Titration as described by Koch-Light Laboratories Limited in their publication 4/77 KLCD-1. The solution on which the ionicity determination is conducted is best made by forming a 1% solution of the polymer in deionised water, allowing this to age, e.g., for 2 hours, and then further diluting it to 0.1% active polymer.

The precise conditions of the test method are not very important provided the same conditions are used for all comparative tests, in order that a meaningful comparison can be made.

The shear that is applied should be consistent in order that reproducible results are obtained. In some processes, for instance when X is being recorded to permit control of the manufacturing process, it is satisfactory if the shearing is conducted for a period insufficient to achieve the maximum value of X, provided the duration and manner of shearing is consistent from one test to another. Generally however the maximum value of X is determined, that is to say the highest value of X that is attainable by applying shear by a rotating blade, preferably by the general technique described below. Normally the maximum value of X is determined by conducting the shearing until there is no further change in the value of X but alternatively the maximum value of X may be estimated by measuring the ionicity of samples that have been sheared for varying degrees of shear (usually increasing periods of time) and plotting these and estimating the maximum from the resultant plot.

The shear may be applied by, e.g., forcing the solution through an orifice or screen (e.g., a Silverson mixer) at a predetermined rate but is preferably applied by subjecting a predetermined volume of the solution to the effect of preset blades rotating at a predetermined speed for a predetermined duration.

Conveniently the shear is applied to 200 ml of the solution in a substantially cylindrical pot having a diameter of about 8 cm and provided in its base with a rotatable blade about 6 cm in diameter, one arm of the blade pointing upwards by about 45 degrees and the other downwards by about 45 degrees. The blade is about 1mm thick and is rotated at 16,500 rpm in the base of the pot. These conditions are best provided by the use of a Moulinex homogeniser but other satisfactory conditions can be provided using kitchen blenders such as Kenwood, Hamilton Beach, Iona or Osterizer blenders or a Waring blender.

In practice the precise conditions of shear are relatively unimportant since, provided the degree of shear is of the same order of magnitude as specified, it will be found that X is not greatly affected by quite large changes in the amount, for instance the duration, of shear, whereas at lower amounts of shear (for instance 1 minute 16,500 rpm), X is greatly affected by small changes in shear. Conveniently, therefore, the value of X is determined at the time when, with a high speed blade, further shear provides little or no further change in ionicity. The duration of shear is that required to reach the maximum value of X, the process depending to a large extent on the degree of cross-linking (including chain branching) of the polymer molecules. Polymers with a low degree of cross-linking require a very short duration of shear, for instance less than 1 minute to reach the maximum X. More highly cross-linked polymer may require up to 10 minutes and often up to 30 minutes of shear in the blender.

The shearing of the polymer solution is thought to break cross-linkages, branches and any other type of inter- or intra- molecular bonding and may also break the backbones of some of the polymer chains. In so doing, ionic groups are revealed that had previously been hidden within the molecule and protected from interactions with reagents used for analysis. The ionic groups are thus able to react with the reagents used to estimate the ionicity. The value X, after shear, is greater than the value Y, before shear, and the maximum value of X is an indication of the total cationicity in the polymer.

When the difference between X and Y is being determined or utilised, this difference is best expressed as ionic regain IR where IR equals $(X-y/X) \times 100$. IR gives a reliable and reproducible measure of the degree of cross-linking or other bonding between or within molecules. The invention is of particular value for polymers having IR values between 10 and 90%, especially 15 to 80%, usually 20 or 25% up to 60 or 70%.

When the polymers are made from water soluble monomers, the higher values of IR indicate that the polymers may be of reduced solubility in water and may instead be insoluble but swellable in water. The solutions that are formed for measuring the ionicity may therefore not be true solutions in water and may instead be stable dispersions of swollen polymer in water, generally in the presence of dissolved polymer.

The polymers may be flocculants and the invention is thus of great value since the degree of cross-linking may determine the effectiveness of a flocculant in any particular environment and/or the amount of flocculant that is required in that environment. The polymers may be conductive resins and here the invention is valuable since it is essential in such resins for a maximum number of charged groups to be available for interaction with other charged entities and the method indicates whether the groups are available. The polymers may be thickeners, where the degree of cross-linking may affect the rheology. The polymers may serve a variety of other purposes, for instance water retention aids, coagulants, absorbents, dispersants and cross-linked acrylate adhesives.

When the method of the invention is being performed during the manufacture or storage of a polyelectrolyte, it may be sufficient to determine Y, the ionicity of the polyelectrolyte before shear, i.e., the polymer exists at the time of performing the test but before applying the shear. From a knowledge of the monomer charge and/or from a knowledge (based on prior experience) of the value of Y that should prevail during the process, this value alone can give a useful indication of whether unwanted cross linking is occurring during manufacture (polymerisation or drying) or storage.

According to a second aspect of the invention, a polyelectrolyte is handled, e.g., analysed, by measuring the cationic value X of the polyelectrolyte after shearing the polyelectrolyte, preferably substantially to the maximum value that is attainable by shearing with a rotating blade, or preferably also the ionic value Y of the polyelectrolyte before shearing are determined, and the difference between X and Y is calculated, preferably as IR.

The value of X alone can be useful in the manufacture of a polyelectrolyte, as a way of confirming whether ionic groups ave been destroyed during the polymerisation or can be used as a way of measuring the absolute ionic content of polyelectrolyte that is being used in a process, especially in a process involving the application of shear to the polymer. Thus it can be used for controlling the required dose of polymer. In most processes however, both X and Y are measured and the difference is utilised, preferably as IR.

The process can be used for analysing the properties of low molecular weight polymers for instance those having molecular weight of at least 800, generally 3000 to 10,000 or more. The invention finds most value in the analysis of higher molecular weight polymers, e.g., having molecular weight 50,000, and most preferably above 500,000 or 1 million. Preferably the polymer has intrinsic viscosity (IV) above 2 dl/g and usually above 4 dl/g. At low IR values, IV may be for instance 8 to 15 or higher, eg up to 20, 30 or even 40, but at high IR values it may be lower. Typically $IV = (100 - IR/a)$ where a is from 4 to 20, preferably 6 to 14.

The process is partcularly useful for testing samples from a larger amount of polymer. The results can be utilised for manual control or automatic control of the production, storage or use of the polymer.

For instance it may be used to test the product of a batch or a continuous polymerisation reaction by the analysis of a solution of a sample of the product from the reactor vessel. The results of the analysis may be used to assess the process conditions and/or the rate of addition of the feedstock, for instance, by an automatic feedback control system. The process is of particular use in polymerisations in which the monomer feedstock has variable monomer concentrations or composition, since the process can now be controlled so that a product having uniform properties can be formed.

The process if of particular use in monitoring the effect of drying the polymer, in the production of dried polymer. If drying is causing IR to rise (or X to decrease) unacceptably, the temperature of drying may be reduced automatically or manually until an acceptable IR is obtained.

The process is of use in monitoring the polymer during storage. If IR is tending to rise, or X to decrease, the polymer should either be used without further storage or the storage conditions should be modified (e.g., the temperature should be reduced) to reduce or eliminate any further rise in IR or decrease in X. Alternatively the storage can be continued until IR has risen to the optimum value for a particular use, and the polymer is used when it reaches this value.

By controlling the conditions during any or all of the process steps in the production, storage or use of the polymer, the efficiency of the whole process can be maximised and the use of ionic monomer can be optimised.

The recorded values, generally the difference between X and Y, can be utilised to select polyelectrolyte suitable for use in any particular process, for instance as a flocculant. Thus when using polyelectrolyte, if the recorded value is unsatisfactory the polyelectrolyte may be rejected. The recorded value, generally IR, can be utilised to control the rate of use of the polyelectrolyte in any particular process, for instance the rate of dosing of a flocculant polymer. For example a polymer feed line to a dosing point may include a sampling facility equipped for analysis of X, and usually also Y, of samples of the product.

Where it is desired to degrade a flocculant by shearing, to given a more even distribution of molecular weights or break cross-linkages, for example as described in European application No. 85302925.4 (not published at the priority date of this application), the IR may be used to assess the amount of shear that should be applied to the flocculant, eg, in order to make sure that the maximum ionicity regain is achieved.

The invention is of particular value when using a polyelectrolyte flocculant in processes as described in application, Ser. No. 855,509, now U.S. Pat. No. 4,720,346, filed even date herewith or application Ser. No. 855,519, now U.S. Pat. No. 4,759,856, filed even date herewith as the difference between X and Y, and especially IR, is a useful parameter for determining the suitability of a flocculant in that process. The entire disclosure of those applications is hereby incorporated by reference into this application.

The invention includes apparatus for polymerising and/or drying and or storing a polymer wherein there are means for subjecting samples of the produced or dried polymer to shear and for making measurements of ionicity of the samples after, and preferably also before the shear. The apparatus preferably includes means for automatically utilising the recorded change in X and for Y to control the polymerisation and/or drying and/or storage.

The invention includes apparatus for supplying polymer to a point of use wherein there are means for subjecting samples of the polymer to shear and for making measurements of ionicity of the samples after, and preferably also before the shear. The apparatus preferably includes means for automatically utilising the recorded change in X and/or Y to control the rate of supply of the polymer of the method of use of the polymer.

The following examples illustrate the invention

EXAMPLE 1

A copolymer of 21 mole% dimethylamino-ethylacrylate quaternised with methyl chloride and acrylamide and having intrinsic viscosity 10 dl/g was prepared by reverse phase polymerisation followed by azeotropic distillation. It was labelled Polymer A and was provided as a 50% dispersion of polymer in oil. The monomers used were commercially pure monomers. Polymer B was formed by the same method but in the presence of 10 ppm MBA, and had intrinsic viscosity 6.6 dl/g.

The cationicity regain of samples of the polymers was recorded at 1, 5 and 10 minutes shearing using the apparatus and the conditions given above. The values are shown in Table 1.

TABLE 1

| Polymer | Shearing Time | | |
|---|---|---|---|
| | 1 min | 5 min | 10 min |
| A | 5% | 9% | 9% |
| B | 21% | 42% | 42% |

For example the ionicity X of the polymer B after the shearing is 100 units when the ionicity before shearing Y is 58 units.

From Table 1 it is apparent that the ionicity increases rapidly and is thereafter not very dependent upon the precise duration of shearing.

The significance of the cationicity regain value was demonstrated by using each product to treat activated sludge over a range of doses prior to dewatering in a laboratory solid-bowl centrifuge. The dose in g/m3 and the suspended solids in the centrate (mg/1) when treated with each of the polymers A and B are shown in Table 2.

TABLE 2

| Dose | A | B |
|---|---|---|
| 20 | 1148 | 1400 |
| 30 | 1088 | 660 |
| 50 | 667 | 368 |
| 60 | 1863 | 244 |
| 70 | 2227 | 342 |
| 80 | 2670 | 402 |
| 100 | 4627 | 626 |
| 120 | 5372 | 726 |

From Table 2 it is apparent that the optimum dose for polymer A having a regain of 9% is at 50 g/m3 whilst the optimum dose for polymer B having IR 42% is at 60 g/m3 but that polymer B gives very satisfactory results over a much wider range, 30 to above 120 g/m3, than is permissible with polymer A. Accordingly the IR can be used to decide which of the polymers A and B is most suitable as a flocculant in the centrifugal dewatering process and the final cationicity X, or preferably IR, can be used to control dose rate in this application since Table 2 shows that the optimum dose varies with IR.

EXAMPLE 2

A copolymer of acrylamide with 38 mole % MeCl quarternised dimethylaminoethyl acrylate (DMAEA.-MeCl) was prepared by gel polymerisation. Samples of the gel were heated in a laboratory oven at 120° C. for different periods of time. Solutions were prepared from the original gel and those which had been heated in the oven, and cationicity regain (IR) was measured using both the Koch-Light method and the method described in GB No. 1,579,007. Further solutions of the gel were prepared and were evaluated as flocculants on a mixed primary/secondary digested sewage sludge. CST was used to indicate the dewaterability of the flocculated sludge samples. The value should be as low as possible. CST (secs) was recorded at dose of 80 and 100g/m3 polymer after mixing in the polymer for 25 seconds using a modified Triton stirrer timer type 131.

| Heating Period | IR | | CST at | |
|---|---|---|---|---|
| (Hrs) | GB 1579007 | Koch-Light | 80 g/m³ | 100 g/m³ |
| 0 | 2.15 | 5.36 | 15 | 11 |
| 0.5 | 31.81 | 28.66 | 45 | 20 |
| 1.0 | 21.09 | 29.03 | 72 | 26 |
| 2.0 | 29.79 | 30.19 | 103 | 43 |
| >18 | 72.00 | 71.50 | 500 | 602 |

The results show that for this application, where the dewatering is a low shear process, it is preferable to use a flocculant having a very low IR indicating a low degree of cross-linking, and so the process of the invention permits selection of an appropriate flocculant and rejection of the remainder.

The IR measurements can be used to control the drying process in order to produce polymers having the optimum degreee of cross-linking for a particular end-use. For instance if IR is found to be too high, or Y is too low, the drying temperature can be reduced in order to reduce the tendency to cross linking. For the high shear centrifugal dewatering process used in Example 11 the product dried to an IR of at least 30% would be most suitable, in contrast to the low shear process in Example 2 for which the low IR products are more suitable.

EXAMPLE 3

A cationic gel at 40.4% solids of polymer ratio 37:63 acrylamide:DMAEA.MeCl was dried in the laboratory under different temperatures. The cationic content was determined on 0.1% solutions of dried gel before and after shearing and % ionic regains calculated. The results are given in the following table.

| Drying Temp | Ionic Content moles Kg⁻¹ | | % Ionic |
|---|---|---|---|
| °C. | Before shearing | After shearing | Regain |
| 30 | 2.09 | 2.22 | 5.9 |
| 60 | 2.07 | 2.25 | 8.0 |
| 90 | 1.94 | 2.11 | 8.1 |
| 120 | 1.34 | 2.07 | 35.3 |

Accordingly, the optimum effective temperature can be maintained by monitoring IR.

EXAMPLE 4

A cationic gel of polymer ratio 37:63 acrylamide:DmAEMA MeCl and an anionic gel of polymer ratio 75:25 acrylamide:sodium acrylate were dried in the laboratory at 120° C. for different lengths of time. The cationic/anionic content was determined on 0.1% solutions of the dried gel before and after shearing and % ionic regains calculated. Results were shown in the following tables.

| Time | Ionic Content moles Kg⁻¹ | | % Ionic |
|---|---|---|---|
| Hours | Before shearing | After shearing | Regain |
| | (i) Cationic gel | | |
| ½ | 2.58 | 2.76 | 6.5 |
| 1 | 2.37 | 2.72 | 12.9 |
| 2 | 2.27 | 2.68 | 15.3 |
| 12 | 0.53 | 1.70 | 68.8 |
| | (ii) Anionic gel | | |
| 4 | 1.13 | 1.47 | 23.0 |
| 8 | 1.13 | 1.54 | 26.6 |
| 16 | 1.13 | 1.66 | 31.9 |
| 22 | 0.86 | 1.69 | 49.1 |
| 24 | 1.11 | 2.41 | 53.9 |

We claim:

1. A method of analyzing a polyelectrolyte to estimate the amount of its chain branching and cross-linkig comprising measuring the ionic value Y of an aqueous solution of a sample of the polyelectrolyte before shearing the polyelectrolyte, shearing the solution measuring the ionic value X of the sheared polyelectrolyte solution and determining the difference between X and Y.

2. A method according to claim 1 in which the ionic value X is measured after applying sufficient shear to raise the ionic value X substantially to the maximum value that is attainable by applying shear by a rotating blade.

3. A method according to claim 1 in which the difference between X and Y is calculated as IR where IR equals $(X-Y/X) \times 100$ and in which IR is from 15% to 80%.

4. A method according to claim 1 in which the polyelectrolyte is a cationic polyelectrolyte having a molecular weight above 500,000.

5. A method according to claim 1 in which the polyelectrolyte is a homopolymer of dialkylaminoalkyl (meth) acrylate (including its acid additiona dn quaternary ammonium salts) or a copolymer thereof with up to 95 mole percent non-ionic monomer.

6. A method in which an aqueous polyelectrolyte gel is dried and during the drying process a sample of the gel is disslved to form an aqueous solution and is then analyzed by the method of claim 1 and the drying conditions of the gel are controlled using the value of the difference between X and Y of the sample.

7. A method in which a polyelectrolyte is retained for a period of time in storage and during storage a sample of the polyelectrolyte is dissolved to form an aqueous solution and is analyzed by the method of claim 1 and the storage conditions for the polyelectrolyte are controlled using the difference between X and Y.

8. A method according to claim 1 in which the polyelectrolyte from which the sample tested was taken is subsequently used in a process of flocculation.

9. A method for assessing the suitability of a polyelectrolyte for use in a flocculation process by estimating the amount of its chain branching and cross-linking, in which the ionic value Y of the polyelectrolyte is measured by testing an aqueous solution of a sample of the polyelectrolyte before shearing, shearing the solution and subsequently testing the ionic value X of the sheared polyelectrolyte solution and then determining the difference between X and Y.

10. A method according to claim 9 in which the ionic value X is measured after applying sufficient shear to the solution to raise the ionic value X substantially to the maximum value that is attainable by applying shear by a rotating blade.

11. A method according to claim 9 in which the polyelectrolyte is a cationic polyelectrolyte having a molecular weight above 500,000.

12. A method according to claim 9 in which the polyelectrolyte is a homopolymer of dialkylaminoalkyl (meth) acrylate (including its acid addition and quaternary ammonium salts) or a copolymer thereof with up to 95 mole % non-ionic monomer.

13. A method according to claim 9 in which the polyelectrolyte from which the sample tested was taken is subsequently used in a process of flocculation.

* * * * *